(12) United States Patent
Lee et al.

(10) Patent No.: US 9,314,683 B2
(45) Date of Patent: Apr. 19, 2016

(54) VIRTUAL GOLF SIMULATION APPARATUS AND METHOD CAPABLE OF COMPENSATION BALL FLIGHT DISTANCE DECREASING RATE

(75) Inventors: Hyang Rak Lee, Seoul (KR); Dong Il Lee, Seoul (KR); Hyoun Seop Song, Seoul (KR)

(73) Assignee: GOLFZON YUWON HOLDINGS CO., LTD., Daejeon (KR)

( * ) Notice: Subject to any disclaimer, the term of this patent is extended or adjusted under 35 U.S.C. 154(b) by 437 days.

(21) Appl. No.: 13/976,444

(22) PCT Filed: Dec. 30, 2011

(86) PCT No.: PCT/KR2011/010371
§ 371 (c)(1),
(2), (4) Date: Jun. 26, 2013

(87) PCT Pub. No.: WO2012/091513
PCT Pub. Date: Jul. 5, 2012

(65) Prior Publication Data
US 2013/0281223 A1    Oct. 24, 2013

(30) Foreign Application Priority Data
Dec. 31, 2010  (KR) .................. 10-2010-0140763

(51) Int. Cl.
*A63B 69/36* (2006.01)
*G09B 19/00* (2006.01)
*A63B 71/06* (2006.01)

(52) U.S. Cl.
CPC ......... *A63B 69/3658* (2013.01); *A63B 69/3661* (2013.01); *G09B 19/0038* (2013.01); *A63B 2071/0638* (2013.01)

(58) Field of Classification Search
None
See application file for complete search history.

(56) References Cited

U.S. PATENT DOCUMENTS

| | | | | |
|---|---|---|---|---|
| 3,563,553 A | * | 2/1971 | Baldwin | A63B 69/3661 473/164 |
| 3,589,732 A | * | 6/1971 | Russell | A63B 69/3658 473/156 |
| 3,655,202 A | * | 4/1972 | Gautraud | A63B 24/0021 473/155 |
| 4,437,672 A | * | 3/1984 | Armantrout | A63B 24/0021 473/153 |
| 5,221,082 A | * | 6/1993 | Curshod | A63B 24/0021 434/252 |
| 5,226,660 A | * | 7/1993 | Curchod | A63B 24/0021 473/155 |
| 5,303,924 A | * | 4/1994 | Kluttz | A63B 24/0021 473/155 |
| 5,655,974 A | * | 8/1997 | Bair | A63B 69/3661 473/262 |
| 5,885,168 A | * | 3/1999 | Bair | A63B 69/3661 473/262 |

(Continued)

FOREIGN PATENT DOCUMENTS

| | | |
|---|---|---|
| JP | 2005-253858 A | 9/2005 |
| KR | 10-2003-0044601 A | 6/2003 |

(Continued)

*Primary Examiner* — Tramar Harper
(74) *Attorney, Agent, or Firm* — Revolution IP, PLLC

(57) ABSTRACT

Disclosed herein are a virtual golf simulation apparatus and method that is capable of applying differences between golf shots based on kinds of a landform of a real golf course when a user performs a golf rounding in the real golf course to hitting environment based on a golf mat, on which the user hits a golf ball, and to a virtual golf course through virtual golf simulation, and that is capable of simultaneously and properly reflecting the hitting environment of the user and the environment of the virtual golf course in simulation results, thereby providing the same sense of reality that the user would feel in the real golf course.

11 Claims, 8 Drawing Sheets

(56) References Cited

U.S. PATENT DOCUMENTS 6,227,973 B1 * 5/2001 Kikuchi .................. A63F 13/10
 273/108.2
2004/0214623 A1 * 10/2004 Takahashi ............... A63F 13/10
 463/2

FOREIGN PATENT DOCUMENTS

KR 10-2009-0056472 A 6/2009
KR 10-0970172 B1 7/2010

* cited by examiner

VIRTUAL GOLF SIMULATION APPARATUS AND METHOD CAPABLE OF COMPENSATION BALL FLIGHT DISTANCE DECREASING RATE

CROSS REFERENCE TO PRIOR APPLICATIONS

This application is a National Stage Application of PCT International Patent Application No. PCT/KR2011/010371 filed on Dec. 30, 2011, under 35 U.S.C. §371, which claims priority to Korean Patent Application No. 10-2010-0140763 filed on Dec. 31, 2010, which are all hereby incorporated by reference in their entirety.

TECHNICAL FIELD

The present invention relates to a virtual golf simulation apparatus and method, and, more particularly, to a virtual golf simulation apparatus and method wherein a virtual golf course is imaged and simulated, and the trajectory of a golf ball directly hit by a user is simulated in the virtual golf course.

BACKGROUND ART

With the recent upsurge of the golfing population, a so-called screen golf system has gained popularity, which allows a golfer to practice golf and to enjoy a virtual golf game using a virtual golf simulation apparatus. The screen golf system senses the velocity and direction of a golf ball that a golfer hits onto a screen installed indoors for displaying a virtual golf range, and displays the progress of the golf ball on the screen.

In a case in which a user performs a golf rounding in a real golf course, a ball flight distance when the golf ball is hit in a fairway is greatly different from that when the golf ball is hit in a rough or in a bunker. Such golf environment is reflected in the screen golf system. For example, a golf mat, on which a user hits a golf ball, may be divided into a fairway region, a rough region, and a bunker region, which have different states of artificial turf in a manner similar to the real golf course. Also, the bunker region may be formed of various materials, by which the user feels as if he or she hit a bunker shot.

Although hitting environment based on the golf mat is configured so as to be similar to the real golf course, however, virtual golf simulation is carried out irrespective of the hitting environment based on the golf mat. As a result, a virtual golf rounding using the virtual golf simulation apparatus is considerably different from that performed in the real golf course.

DISCLOSURE OF INVENTION

Technical Problem

Therefore, it is an object of the present invention to provide a virtual golf simulation apparatus and method that is capable of applying differences between golf shots based on kinds of a landform of a real golf course when a user performs a golf rounding in the real golf course to hitting environment based on a golf mat, on which the user hits a golf ball, and to a virtual golf course through virtual golf simulation, and that is capable of simultaneously and properly reflecting the hitting environment of the user and the environment of the virtual golf course in simulation results, thereby providing the same sense of reality that the user would feel in the real golf course.

Solution to Problem

In accordance with one aspect of the present invention, the above and other objects can be accomplished by the provision of a virtual golf simulation apparatus to perform virtual golf simulation on a virtual golf course including a sensing device to sense a golf ball placed on a golf mat and sense movement of the golf ball after the golf ball is hit, an image processing unit to realize a simulation image regarding a trajectory of the golf ball on the virtual golf course based on results sensed by the sensing device, and a control unit to adjust a ball flight distance based on the trajectory of ball simulated according to a landform, in which the golf ball is placed, on the virtual golf course.

The golf mat may be configured to have a fairway region and a trouble region, and the control unit may be configured to adjust the ball flight distance based on the trajectory of ball simulated according to the landform, in which the golf ball is placed, on the virtual golf course and the region of the golf mat, in which the golf ball sensed by the sensing device is placed.

The control unit may be set to calculate different ball flight distances based on kinds of the landform, in which the golf ball is placed, on the virtual golf course.

In accordance with another aspect of the present invention, there is provided a virtual golf simulation method to perform virtual golf simulation on a virtual golf course including simulating a trajectory of a golf ball in a virtual golf course according to sensed results of the golf ball after the golf ball is hit, checking the kind of a landform, in which the golf ball is placed, on the virtual golf course as the result of the simulation, and applying a predetermined ball flight distance decreasing rate to the checked landform to simulate the trajectory of the golf ball.

In accordance with a further aspect of the present invention, there is provided a virtual golf simulation method to perform virtual golf simulation when a golf ball is hit on a golf mat having a fairway region and a trouble region including calculating a ball flight distance decreasing rate based on a landform, in which the ball is placed, on a virtual golf course of a virtual golf simulation image, calculating a compensation value based on a region, in which the ball is placed, on the golf mat using a sensing device, calculating a trajectory of the ball based on movement of the hit ball sensed by the sensing device, and performing simulation based on results obtained by calculating the ball flight distance decreasing rate and the compensation value with respect to a ball flight distance of the ball based on the calculated trajectory of the ball according to predetermined conditions.

Advantageous Effects of Invention

In the virtual golf simulation apparatus and method according to the present invention, it is possible to apply differences between golf shots based on kinds of a landform of a real golf course when a user performs a golf rounding in the real golf course to hitting environment based on a golf mat, on which the user hits a golf ball, and to a virtual golf course through virtual golf simulation. Also, it is possible to simultaneously and properly reflect the hitting environment of the user and the environment of the virtual golf course in simulation results. Consequently, the present invention has the effect of providing the same sense of reality that the user would feel in the real golf course.

BRIEF DESCRIPTION OF DRAWINGS

The above and other objects, features and other advantages of the present invention will be more clearly understood from the following detailed description taken in conjunction with the accompanying drawings, in which.

BEST MODE FOR CARRYING OUT THE INVENTION

Now, exemplary embodiments of a virtual golf simulation apparatus and method according to the present invention capable of compensation a ball flight distance decreasing rate will be described in detail with reference to the accompanying drawings.

First, a virtual golf simulation apparatus according to an embodiment of the present invention will be described in detail with reference to FIGS. 1 to 3.

Figure 1:
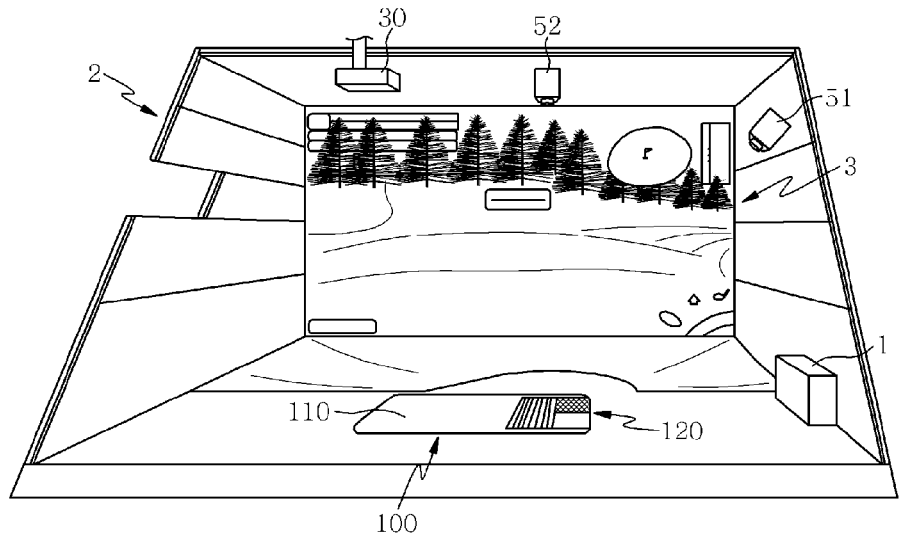
FIG. 1 is a view showing an example of a screen golf system to which a virtual golf simulation apparatus according to an embodiment of the present invention is applied.
Figure 2:
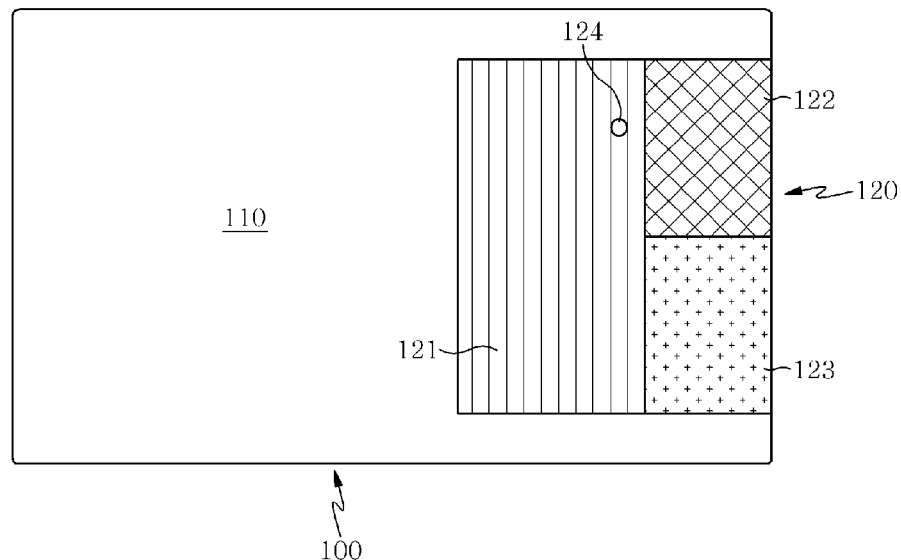
FIG. 2 is a view showing a swing plate shown in FIG. 1 in more detail.
Figure 3:
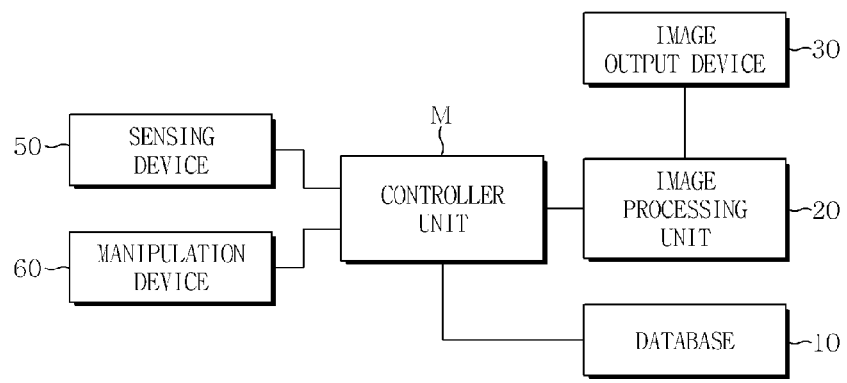
FIG. 3 is a schematic block diagram showing the construction of the virtual golf simulation apparatus shown in FIG. 1.

As shown in FIGS. 1 to 3, a sensing device 50 used in the virtual golf simulation apparatus according to the embodiment of the present invention includes camera units 51 and 52 and a sensing processing unit (not shown) for processing images captured by the camera units 51 and 52 to process an image of a golf ball hit by a user and/or a golf club used for the user to hit the golf ball and to analyze the hit ball.

FIG. 2 show a case in which the two camera units 51 and 52 are provided. However, the number of camera units is not limited thereto. For example, one or more camera units may be used.

The sensing processing unit (not shown) analyzes and extracts images captured by the camera units 51 and 52 and transmits information on the analyzed and extracted images to a simulator 1.

The simulator 1 includes a control unit M, a database 10, an image processing unit 20, and an image output device 30. The simulator 1 may further include a manipulation device 60 as a means for allowing a user to set a virtual golf simulation environment or to adjust aiming during a virtual golf rounding.

The control unit M converts information on coordinates of center points regarding movement of a golf ball and/or a golf club image-processed and extracted by the sensing device 50 into three-dimensional coordinate information to calculate physical information for movement trajectory simulation of the golf ball and transmits the calculated physical information to the image processing unit 20.

Data for movement trajectory simulation of the golf ball are extracted from the database 10, and image processing of movement trajectory simulation of the golf ball by the image processing unit 20 may be achieved by extracting image data from the database 10.

Here, a converting means to convert coordinate information of the golf ball transmitted from the sensing device 50 into three-dimensional coordinate information may be provided separately from the control unit M.

An example of a screen golf system, to which the virtual golf simulation apparatus with the above-stated construction is applied, is shown in FIG. 1.

As shown in FIG. 1, a screen 3, on which an image output from the image output device 30 is projected, is provided at the front of a golf booth 2, and a hitting box 110, on which a user hits a golf ball, is provided at one side of the floor of the golf booth 2. The hitting box may be provided on a swing plate 100 or on the floor of the golf booth 2. (In the following description, the swing plate 100 is provided on the hitting box.) The swing plate 100 may be configured to be slopped in correspondence to the landform of a virtual golf course.

A golf mat 120, on which a golf ball is placed so that the user can hit the golf ball, is provided at one side of the swinging plate 100.

The golf mat 120 may be divided into a fairway region 121 and a trouble region so as to provide an environment similar to an real golf course including a fairway, a rough, and a bunker prepared based on a state of turf.

The trouble region may be configured to include a rough region 122 and/or a bunker region 123. FIG. 2 shows a case in which the trouble region includes both the rough region 122 and the bunker region 123.

The fairway region 121, the rough region 122, and the bunker region 123 may be provided so as to have different states of artificial turf. On the other hand, the bunker region 123 may be formed of a special material instead of the artificial turf so as to provide touch similar to an real bunker.

That is, the fairway region 121 of the golf mat 120 is a region prepared so that the user can normally hit a golf ball in the same manner as in a fairway of an real golf course, the rough region 122 is a region prepared so that it is harder for the user to hit a golf ball than in the fairway in the same manner as in a rough of the real golf course, and the bunker region 123 is a region prepared so that it is very difficult for the user to hat a golf ball in the same manner as in a bunker of the real golf course.

Also, a tee 1424, on which a golf ball is placed so that the user can hit a drive shot, may be provided at the golf mat 120.

A screen, on which a virtual golf simulation image realized by the image output device 30 is displayed, may be provided at the front of a golf booth B, and camera units 51 and 52 and a lighting device (not shown) may be provided at the ceiling and wall of the golf booth B.

FIG. 1 shows a case in which the camera units 51 and 52 are provided at the ceiling and wall of the golf booth. However, the location of the camera units is not limited thereto. For example, the camera units may be installed at any position so long as the camera units do not disturb golf swinging of a user and a golf ball, hit by the user, does not collide with the camera units while the camera units can effectively capture images regarding movement of the golf ball.

In the system with the above-stated construction, when the user on the hitting box 110 hits a golf ball on the golf mat 120 to the screen, the camera units 51 and 52 to capture a predetermined region at which the golf ball is hit, i.e. a hitting region, capture a plurality of frame images.

Meanwhile, the virtual golf simulation apparatus according to the present invention is basically configured to adjust a ball flight distance based on whether a user hits a golf ball in a fairway, in a rough, or in a bunker on an simulation image during a virtual golf rounding.

That is, a phenomenon in which ball flight distances are different although a user hits a golf ball under the same conditions when the user hits the golf ball in a fairway, in a rough, or in a bunker of an real golf course is reflected in a virtual golf simulation environment so that simulation is carried out in a state in which the ball flight distances are further reduced when the user hits the golf ball in the rough or in the bunker than when the user hits the golf ball in the fairway, thereby providing the same sense of reality that the user would feel in the real golf course.

For example, when a golf ball is placed in a rough during a virtual golf rounding, simulation is carried out in a state in which a ball flight distance decreasing rate of 20% is applied to a shot in the rough as compared with a shot in a fairway. On the other hand, when a golf ball is placed in a bunker during the virtual golf rounding, simulation is carried out in a state in which a ball flight distance decreasing rate of 40% is applied to a shot in the bunker as compared with a shot in the fairway.

Here, the ball flight distance decreasing rate of 20% or 40% is a value which is 20% or 40% reduced from a normally calculated ball flight distance, recorded by a golf ball on an simulation image obtained by sensing a golf ball hit by the user using the sensing device and simulating the trajectory of the golf ball. That is, a ball flight distance equivalent to a value obtained by subtracting a value corresponding to 20% or 40% of the normally calculated value from the normally calculated value is applied to the simulation result so as to be displayed as a simulation image.

Also, a rough of a real golf course may include a light rough and a heavy rough having turf the length of which is longer than that of the turf in the light rough. In the same manner, a bunker of the real golf course may include a fairway bunker and a green bunker having finer sand than the fairway bunker and at which it is harder for the user to hit a golf ball than in the fairway bunker.

Consequently, the above factors may be reflected in the virtual golf simulation environment so that the light rough and the heavy rough have different ball flight distance decreasing rates and so that the fairway bunker and the green bunker have different ball flight distance decreasing rates.

Also, the ball flight distance decreasing rate may be separately defined based on the landform of the real golf course. For example, in a damp area, a ball flight distance decreasing rate different from the ball flight distance decreasing rate of the rough or the bunker may be set.

Meanwhile, in the virtual golf simulation environment as described above, a predetermined ball flight distance decreasing rate is applied based on the landform in which a golf ball is hit. The golf mat 120, on which the user hits a golf ball, is divided into a fairway region and a trouble region. When the user hits a golf ball on a rough region on the golf mat although the user hits the golf ball in a rough in an simulation image, the user hits the golf ball in the rough region, in which it is harder for the user to hit the golf ball than in the fairway region, and a ball flight distance is reduced from the simulation result. As a result, the difference between the simulation result and a real shot is great.

According to the present invention, therefore, a ball flight distance decreasing rate based on the landform on a simulation image is corrected based on the regions of the golf mat on which the user hits the golf ball to further improving accuracy of the simulation result.

For example, when a golf ball is hit on the rough landform in the simulation image and the user hits a golf ball in the fairway region on the golf mat, a predetermined ball flight distance decreasing rate is applied without change. On the other hand, when a golf ball is hit on the rough landform in the simulation image and the user hits a golf ball in the rough region on the golf mat, a ball flight distance decreasing rate of 0% is applied, or the ball flight distance decreasing rate is further reduced so that the ball flight distance of the simulation result is little less reduced. (Since the user hits a golf ball in the rough region, the ball flight distance is further reduced than when the user hits a golf ball in the fairway region. In this case, if the ball flight distance decreasing rate when the user hits the golf ball in the rough landform is applied the simulation result without change, the ball flight distance is excessively reduced. For this reason, the ball flight distance decreasing rate is corrected.)

That is, a compensation value preset for each region on the golf mat, on which the user actually hits a golf ball, is applied to a predetermined ball flight distance decreasing rate with respect to the landform, on which the golf ball is hit, of the simulation image, and then simulation is carried out.

Application of the compensation value will be described in detail with reference to FIGS. 4 to 7.

Figure 4:
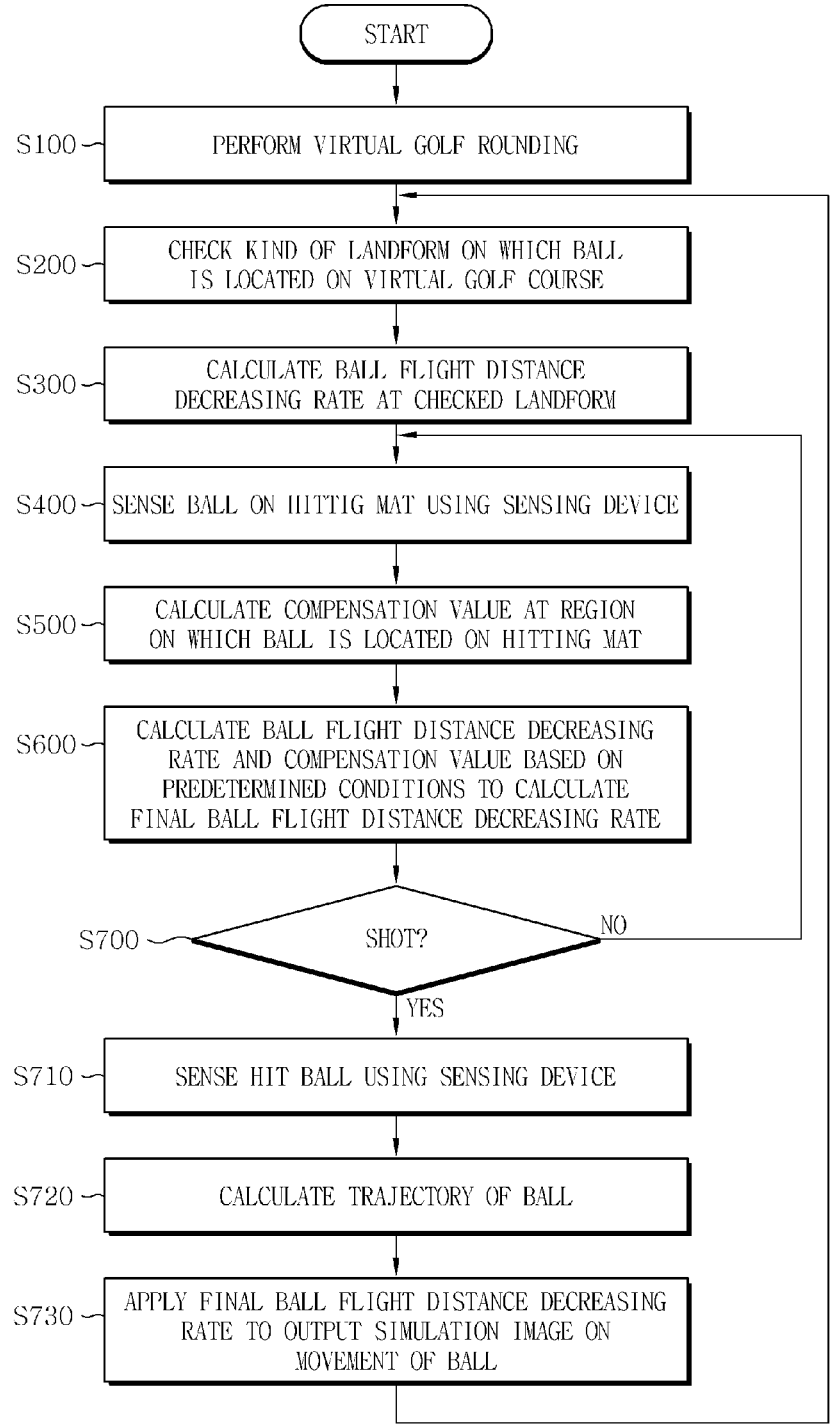
FIG. 4 is a flow chart showing a virtual golf simulation method according to an embodiment of the present invention.
Figure 5:
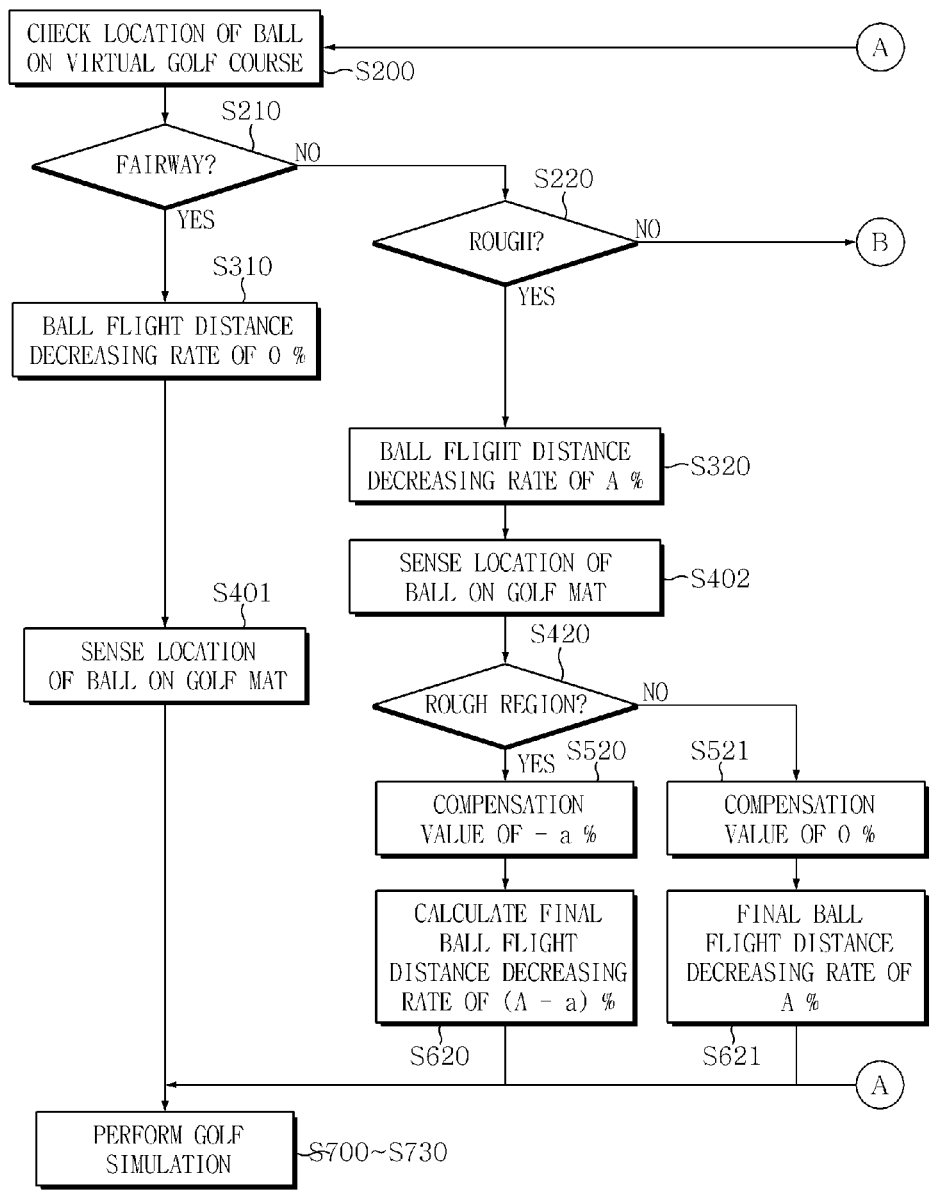
FIGS. 5 to 10 are flow charts showing more realized embodiments of steps S200 to S600 shown in FIG. 4.
Figure 6:
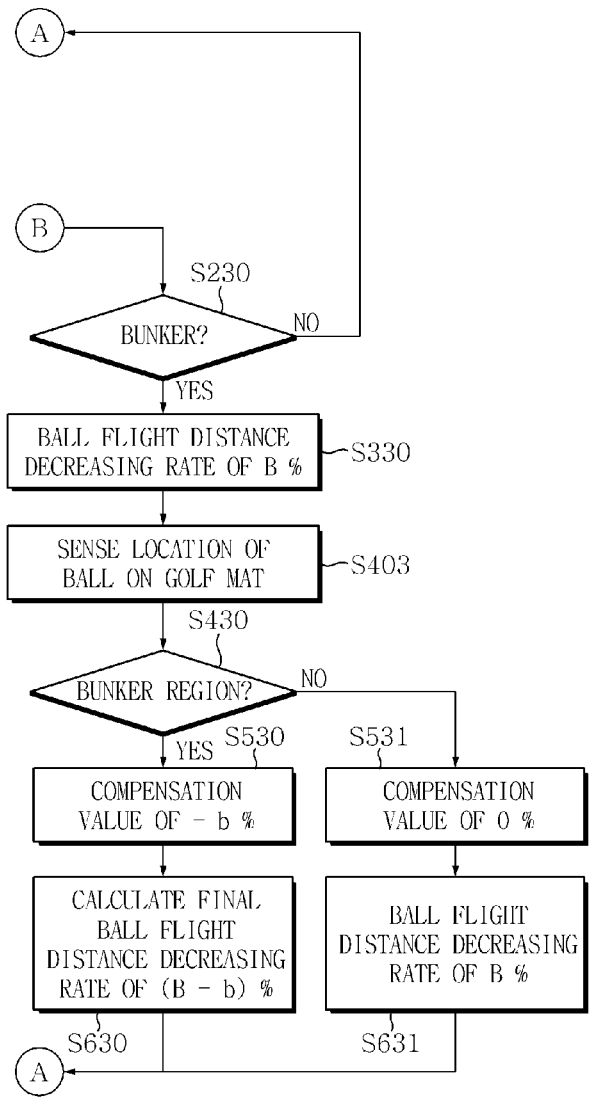
Figure 7:
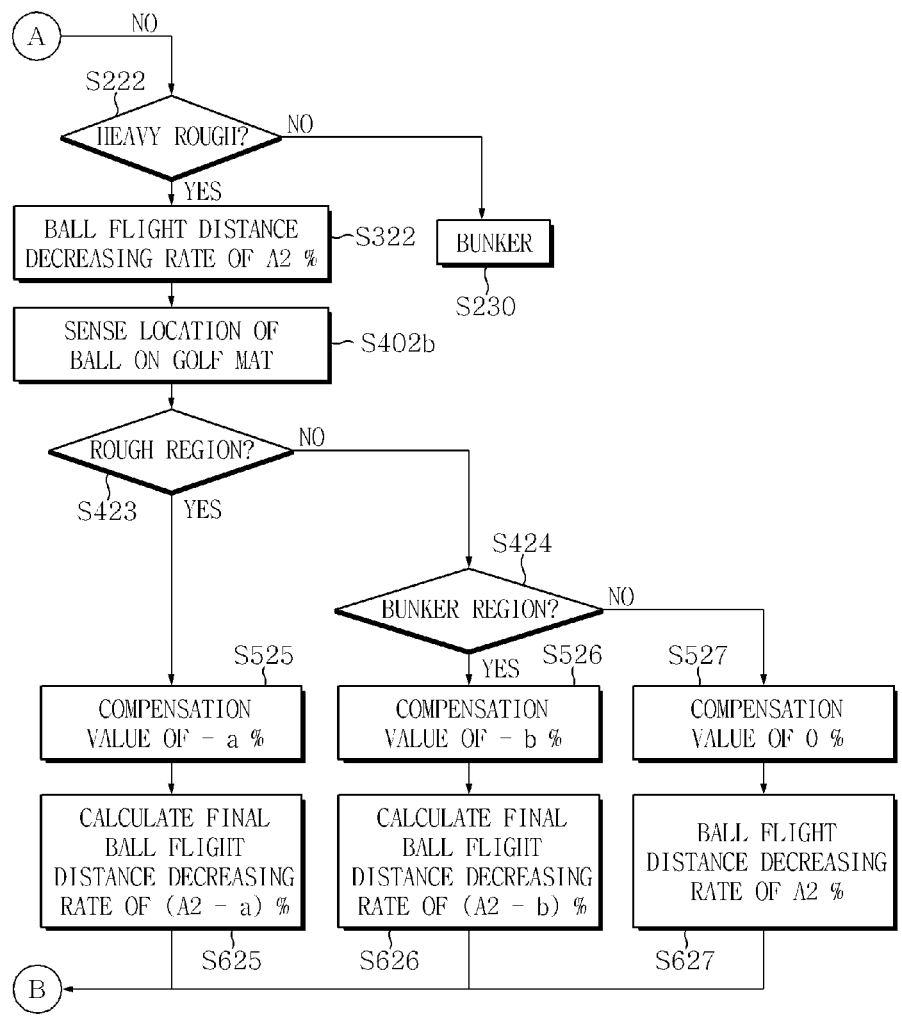

FIG. 4 is a flow chart showing a virtual golf simulation method according to an embodiment of the present invention, and FIGS. 5 to 7 are flow charts showing more realized embodiments of steps S200 to S600 shown in FIG. 4.

First, a virtual golf simulation method according to an embodiment of the present invention will be described with reference to FIG. 4.

As a user performs a virtual golf rounding (S 100), the kind of a landform of a virtual golf course, on which a golf ball is placed, in a simulation image is checked (S200). That is, it is determined whether the landform on which the golf ball hit by the user has dropped is a fairway, a rough, or a bunker.

Subsequently, a ball flight distance decreasing rate applied when the user hits the golf ball on a specific landform of the virtual golf course, on which the golf ball is placed, in the simulation image is calculated (S300).

For example, a ball flight distance decreasing rate applied when the user hits the golf ball placed in a rough is calculated to 20%, and a ball flight distance decreasing rate applied when the user hits the golf ball placed in a bunker is calculated to 40%.

On the other hand, the sensing device 50 (see FIG. 3) senses the golf ball placed on the golf mat (S400). More specifically, the camera units 51 and 52 (see FIG. 1) capture images of the golf mat, on which the golf ball is placed, and sensing processing unit extracts images of the golf ball from the captured images to sense on which region of the golf mat the golf ball is placed, i.e. whether the golf ball is placed in the fairway region, in the rough region, or in the bunker region.

When the region on which the golf ball is placed is sensed, a compensation value of the corresponding region is calculated (S500).

For example, when the golf ball is placed in the rough region, a compensation value of 20 may be calculated, and, when the golf ball is placed in the bunker region, a compensation value of 40 may be calculated.

The ball flight distance decreasing rate calculated at step S300 and the compensation value calculated at step S500 are calculated according to a predetermined condition to calculate a final ball flight distance decreasing rate (S600).

Here, calculating the ball flight distance decreasing rate and the compensation value according to the predetermined condition means that the ball flight distance decreasing rate and the compensation value are calculated using an appropriate calculation method so that a ball flight distance based on the simulation result obtained by the user hitting a golf ball on the golf mat is maximally approximate to a ball flight distance obtained by the user hitting a golf ball in a real golf course under the same conditions.

Such calculation may be achieved using a simple calculation method, such as addition or subtraction, or may be achieved using a complicated empirical formula.

For example, when the golf ball is placed in the rough of the simulation image, the ball flight distance decreasing rate is 20%, and, when the golf ball is actually placed in the rough region on the golf mat, the compensation value is 20. At this time, subtraction may be applied so that a final ball flight distance decreasing rate of 0% can be calculated.

Also, when the golf ball is placed in the bunker of the simulation image, the ball flight distance decreasing rate is 40%, and, when the golf ball is actually placed in the rough region on the golf mat, the compensation value is 20. At this time, subtraction may be applied so that a final ball flight distance decreasing rate of 20% can be calculated.

Meanwhile, when the user hits the golf ball placed on the golf mat (S700) after the final ball flight distance decreasing rate is calculated, the sensing device senses the golf ball hit by the user (S710). The simulator calculates the trajectory of the golf ball based on the sensed result (S720) and outputs an simulation image regarding movement of the golf ball. At this time, the calculated final ball flight distance decreasing rate is applied and then the simulation image is output (S730).

Meanwhile, a virtual golf simulation method according to another embodiment of the present invention will be described with reference to FIGS. 5 and 6. FIGS. 5 and 6 show a case in which, in steps S200 to S600 shown in FIG. 4, a ball flight distance decreasing rate is preset with respect to a fairway, a rough, and a bunker of a virtual golf course, and the golf mat is divided into a fairway region, a rough region, and a bunker region. FIGS. 5 and 6 are divided from a flow chart. "A" and "B" in FIG. 5 correspond to "A" and "B" in FIG. 6, respectively.

The location of a golf ball placed on a virtual golf course during a virtual golf rounding is checked (S200) and it is determined whether the golf ball is placed in the fairway (S210), whether the golf ball is placed in the rough (S220), and whether the golf ball is placed in the bunker (S230).

When it is determined that the golf ball is placed in the fairway of the simulation image (S210), a ball flight distance decreasing rate becomes 0 (S310), and the trajectory of the golf ball calculated based on the result sensed by the sensing device is normally simulated.

The sensing device senses the location of the golf ball on the golf mat (S401), and, when a user hits the golf ball, the sensing devices senses the golf ball hit by the user to perform golf simulation.

When it is determined that the golf ball is placed in the rough of the simulation image (S220), a ball flight distance decreasing rate becomes A % (S320), and the sensing device senses the location of the golf ball on the golf mat (S402) to determine whether the golf ball is placed in the rough region (S420).

When it is determined that the golf ball is placed in the rough region, a compensation value of −a % is calculated (S520), and a final ball flight distance decreasing rate becomes (A−a) % (S620). When it is determined that the golf ball is not placed in the rough region (in this case, the golf ball is almost placed in the fairway region), a compensation value becomes 0%, and a final ball flight distance decreasing rate becomes A % (S621). Here, A and a indicate integers.

On the other hand, when it is determined that the golf ball is placed in the bunker of the simulation image (S230), a ball flight distance decreasing rate becomes B % (S330), and the sensing device senses the location of the golf ball on the golf mat (S403) to determine whether the golf ball is placed in the bunker region (S430).

When it is determined that the golf ball is placed in the bunker region, a compensation value of −b % is calculated (S530), and a final ball flight distance decreasing rate becomes (B−b) % (S630). When it is determined that the golf ball is not placed in the bunker region (in this case, the golf ball is almost placed in the fairway region), a compensation value becomes 0%, and a final ball flight distance decreasing rate becomes B % (S621). Here, B and b indicate integers.

Since hitting a golf ball in the rough is harder than hitting a golf ball in the bunker, the ball flight distance when the golf ball is hit in the bunker is shorter than the ball flight distance when the golf ball is hit in the rough. Consequently, it is preferable to adjust the ball flight distance decreasing rate so that the ball flight distance decreasing rate when the golf ball is hit in the bunker is greater than the ball flight distance decreasing rate when the golf ball is hit in the rough. Preferably, the ball flight distance decreasing rate is adjusted so that A<B. Also, the compensation values a and b may be set so that a and b are equal to each other or b is greater than a based on the state of the golf mat.

Figure 8:
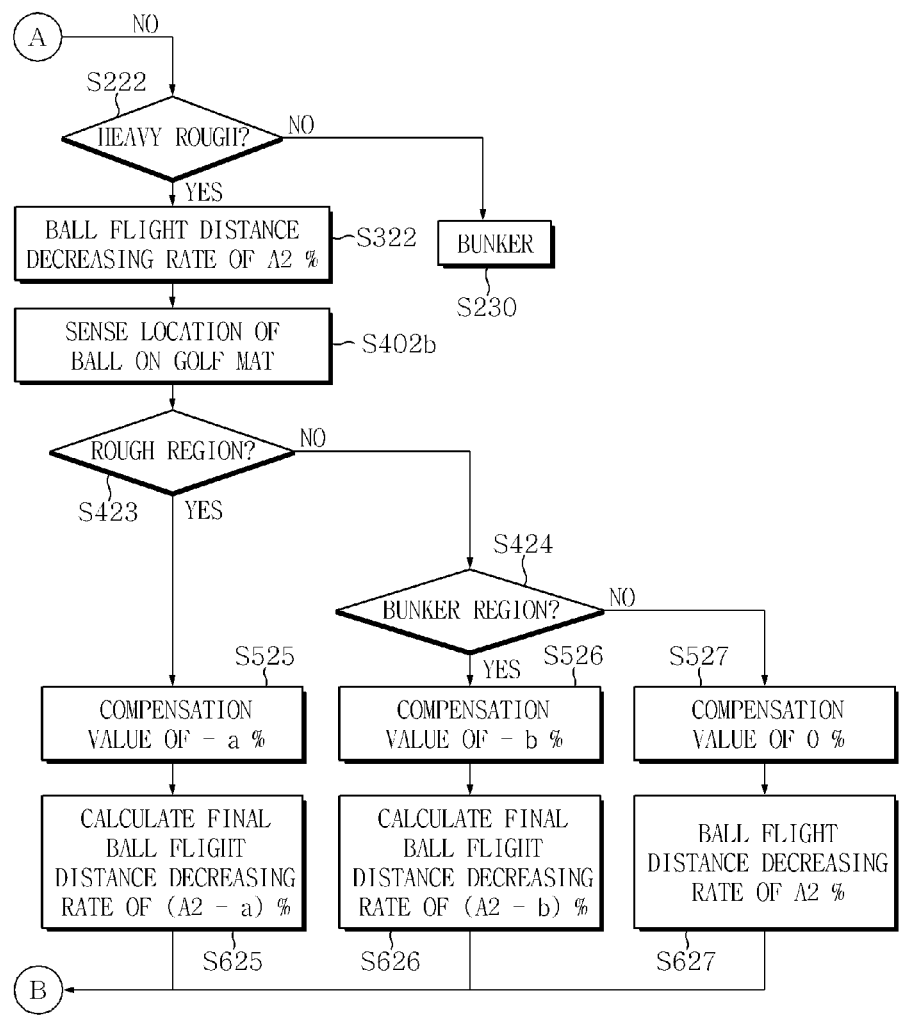

Hereinafter, a virtual golf simulation method according to another embodiment of the present invention will be described with reference to FIGS. 7 and 8. FIGS. 7 and 8 show a more concrete embodiment of a case in which a golf ball is placed in a rough of a virtual golf course in the flow chart shown in FIGS. 5 and 6. FIGS. 7 and 8 are divided from a flow chart. "A" and "B" in FIG. 7 correspond to "A" and "B" in FIG. 8, respectively.

In the embodiment shown in FIGS. 7 and 8, the rough of the virtual golf course is divided into a light rough and a heavy rough.

When the location of a golf ball placed on a virtual golf course during a virtual golf rounding is checked to determine that the golf ball is placed in a rough (S220), it is determined whether the golf ball is placed in a light rough (S221) or whether the golf ball is placed in a heavy rough (S222). When it is determined that the golf ball is placed neither in the light rough nor in the heavy rough, it is determined whether the golf ball is placed in a bunker.

When it is determined that the golf ball is placed in the light rough of the simulation image (S211), a ball flight distance decreasing rate becomes A1% (S321), and the sensing device senses the location of the golf ball on the golf mat (S402a) to determine whether the golf ball is placed in the rough region (S421) or whether the golf ball is placed in the bunker region (S422).

When it is determined that the golf ball is placed in the rough region, a compensation value of −a % is calculated (S522), and a final ball flight distance decreasing rate becomes (A1−a) % (S622). When it is determined that the golf ball is placed in the bunker region, a compensation value becomes −b % (S523), and a final ball flight distance decreasing rate becomes (A1−b) % (S623). When it is determined that the golf ball is placed in the fairway region, a compensation value becomes 0% (S524), and a final ball flight distance decreasing rate becomes A1% (S624). Here, A1, a and b indicate integers.

On the other hand, when it is determined that the golf ball is placed in the heavy rough of the simulation image (S222), a ball flight distance decreasing rate becomes A2% (S322), and the sensing device senses the location of the golf ball on the golf mat (S402b) to determine whether the golf ball is placed in the rough region (S423) or whether the golf ball is placed in the bunker region (S424).

When it is determined that the golf ball is placed in the rough region, a compensation value of −a % is calculated (S525), and a final ball flight distance decreasing rate becomes (A2−a) % (S625). When it is determined that the golf ball is placed in the bunker region, a compensation value becomes −b % (S526), and a final ball flight distance decreasing rate becomes (A2−b) % (S626). When it is determined that the golf ball is placed in the fairway region, a compensation value becomes 0% (S527), and a final ball flight distance decreasing rate becomes A2% (S627). Here, A2, a and b indicate integers.

Since hitting a golf ball in the heavy rough is harder than hitting a golf ball in the light rough, the ball flight distance when the golf ball is hit in the heavy rough is shorter than the ball flight distance when the golf ball is hit in the light rough. Consequently, it is preferable to adjust the ball flight distance decreasing rate so that the ball flight distance decreasing rate when the golf ball is hit in the heavy rough is greater than the ball flight distance decreasing rate when the golf ball is hit in the light rough. Preferably, the ball flight distance decreasing rate is adjusted so that A1<A2. Also, the compensation values a and b may be set so that a and b are equal to each other or b is greater than a based on the state of the golf mat.

Figure 9:
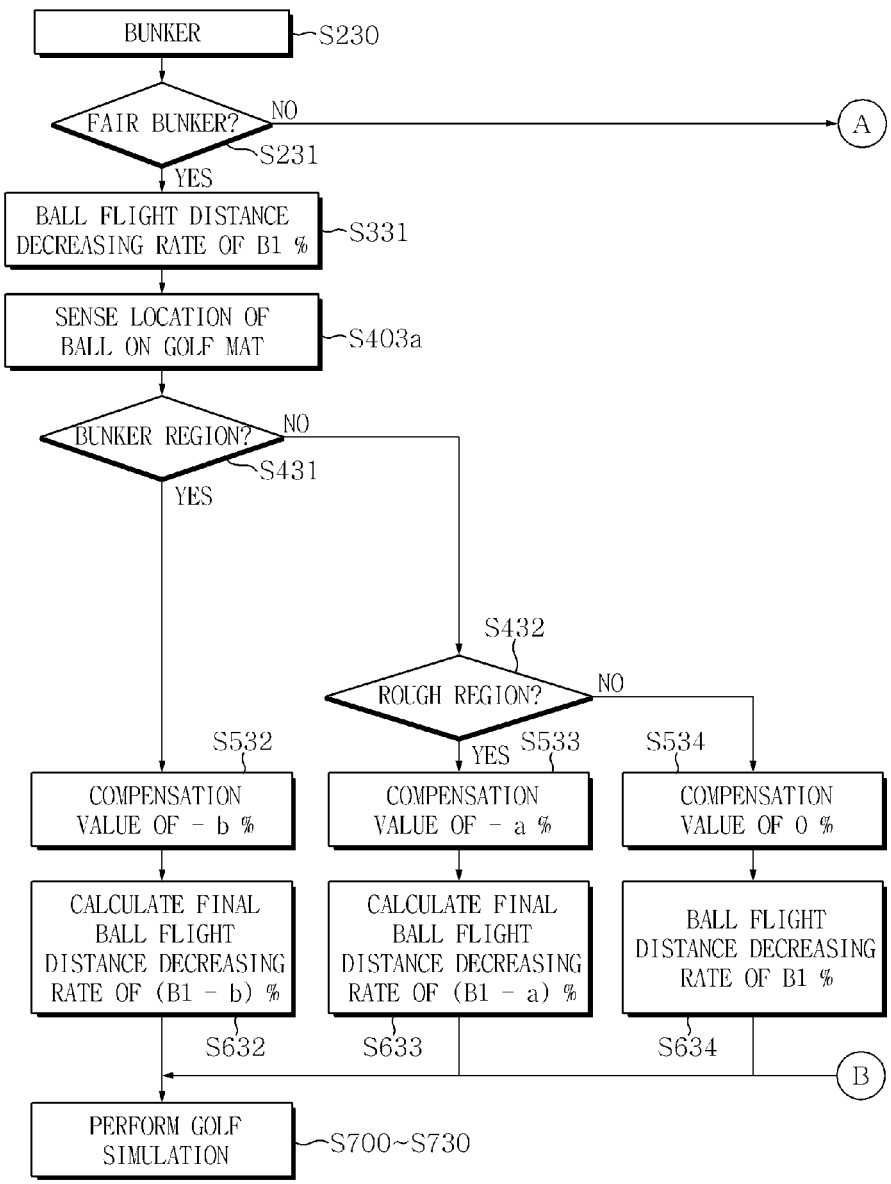
Figure 10:
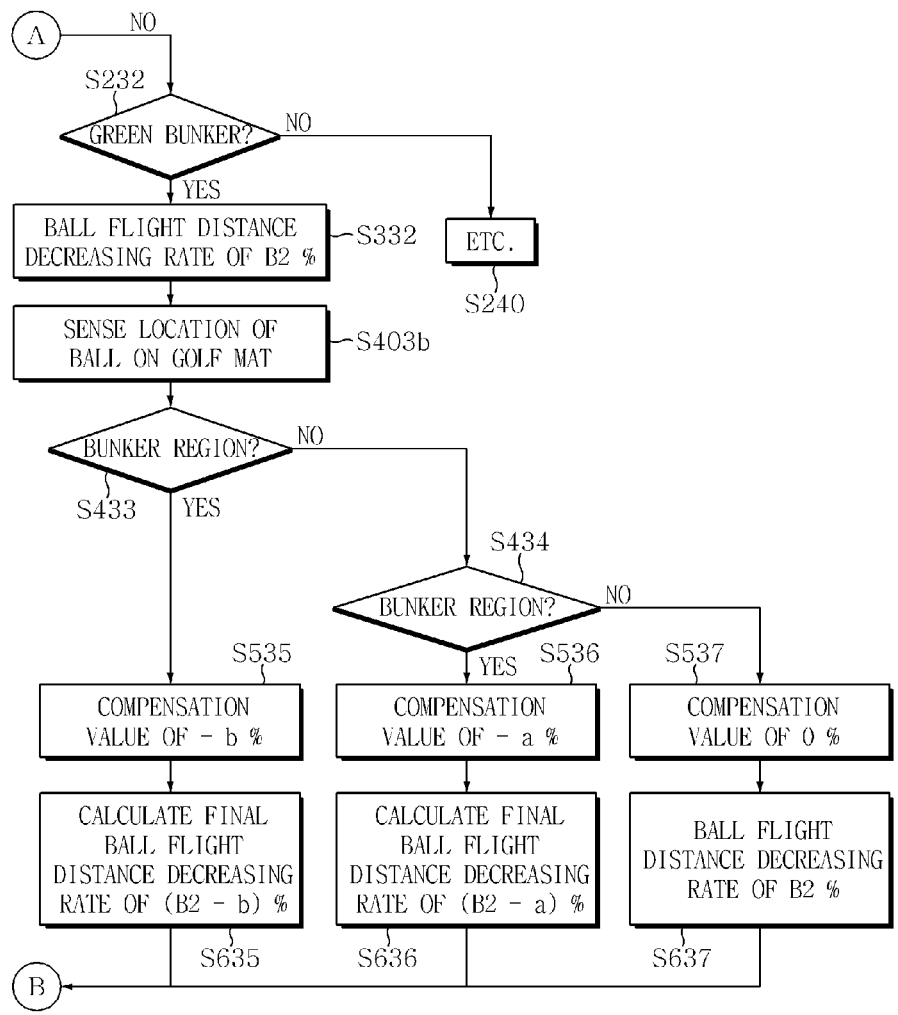

Hereinafter, a virtual golf simulation method according to another embodiment of the present invention will be described with reference to FIGS. 9 and 10. FIGS. 9 and 10 show a more concrete embodiment of a case in which a golf ball is placed in a bunker of a virtual golf course in the flow chart shown in FIGS. 5 and 6. FIGS. 9 and 10 are divided from a flow chart. "A" and "B" in FIG. 9 correspond to "A" and "B" in FIG. 10, respectively.

In the embodiment shown in FIGS. 9 and 10, the bunker of the virtual golf course is divided into a fairway bunker and a green bunker.

When the location of a golf ball placed on a virtual golf course during a virtual golf rounding is checked to determine that the golf ball is placed in a bunker (S230), it is determined whether the golf ball is placed in a fairway bunker (S231) or whether the golf ball is placed in a green bunker (S232). When it is determined that the golf ball is placed neither in the fairway bunker nor in the green bunker, it is determined whether the golf ball is placed in another landform (for example, a special landform, such as a damp area, which cannot be defined as a rough or a bunker).

When it is determined that the golf ball is placed in the fairway bunker of the simulation image (S231), a ball flight distance decreasing rate becomes B1% (S331), and the sensing device senses the location of the golf ball on the golf mat (S403a) to determine whether the golf ball is placed in the bunker region (S431) or whether the golf ball is placed in the rough region (S422).

When it is determined that the golf ball is placed in the bunker region, a compensation value of −b % is calculated (S532), and a final ball flight distance decreasing rate becomes (B1−b) % (S632). When it is determined that the golf ball is placed in the rough region, a compensation value becomes −a % (S533), and a final ball flight distance decreasing rate becomes (B1−a) % (S633). When it is determined that the golf ball is placed in the fairway region, a compensation value becomes 0% (S534), and a final ball flight distance decreasing rate becomes B1% (S634). Here, B1, a and b indicate integers.

On the other hand, when it is determined that the golf ball is placed in the green bunker of the simulation image (S232), a ball flight distance decreasing rate becomes B2% (S332), and the sensing device senses the location of the golf ball on the golf mat (S403b) to determine whether the golf ball is placed in the bunker region (S433) or whether the golf ball is placed in the rough region (S434).

When it is determined that the golf ball is placed in the bunker region, a compensation value of −b % is calculated (S535), and a final ball flight distance decreasing rate becomes (B2−b) % (S635). When it is determined that the golf ball is placed in the rough region, a compensation value becomes −a % (S536), and a final ball flight distance decreasing rate becomes (B2−a) % (S636). When it is determined that the golf ball is placed in the fairway region, a compensation value becomes 0% (S537), and a final ball flight distance decreasing rate becomes B2% (S627). Here, B2, a and b indicate integers.

Since hitting a golf ball in the green bunker is harder than hitting a golf ball in the fairway bunker, the ball flight distance when the golf ball is hit in the green bunker is shorter than the ball flight distance when the golf ball is hit in the fairway bunker. Consequently, it is preferable to adjust the ball flight distance decreasing rate so that the ball flight distance decreasing rate when the golf ball is hit in the fairway bunker is greater than the ball flight distance decreasing rate when the golf ball is hit in the fairway bunker. Preferably, the ball flight distance decreasing rate is adjusted so that B1<B2. Also, the compensation values a and b may be set so that a and b are equal to each other or b is greater than a based on the state of the golf mat.

Also, in the rough shown in FIGS. 7 and 8 and the bunker shown in FIGS. 9 and 10, the ball flight distance decreasing rates may be preset so that A1>A2>B1>B2 or so that A1>A2=B1>B2.

MODE FOR THE INVENTION

Various embodiments of a virtual golf simulation apparatus and method have been described in the best mode for carrying out the invention.

INDUSTRIAL APPLICABILITY

In the virtual golf simulation apparatus and method the according to the present invention as described above, it is possible to apply differences between golf shots based on kinds of a landform of a real golf course when a user performs a golf rounding in the real golf course to hitting environment based on a golf mat, on which the user hits a golf ball, and to a virtual golf course through virtual golf simulation. Also, it is possible to simultaneously and properly reflect the hitting environment of the user and the environment of the virtual golf course in simulation results. Consequently, it is possible to provide the same sense of reality that the user would feel in the real golf course, and therefore, the present invention can be widely used in industries related to the virtual golf simulation apparatus and method.

The invention claimed is:

1. A virtual golf simulation apparatus for a user to play virtual golf by simulating a trajectory of a virtual ball which is a simulated image of a physical golf ball, in a virtual golf course when the physical golf ball is hit on a golf mat, the golf mat having regions comprising a fairway region and a trouble region, the apparatus comprising:

a sensing device to detect whether the physical golf ball is placed on the fairway region or the trouble region of the golf mat and to detect movement of the physical golf ball from one of the regions after the physical golf ball is hit by a golf swing; and an image processing unit to determine a simulation image regarding the trajectory of the virtual ball associated with the virtual golf course according to the detected one of the regions and the movement detected by the sensing device, wherein a control unit is configured to calculate the trajectory of the virtual ball based on movement of the physical golf ball detected by the sensing device, and to adjust the virtual ball flight distance by calculating an adjustment rate and to apply the adjustment rate to the trajectory of the virtual ball simulated, the adjustment rate is differently calculated according to whether the physical golf ball placed on the fairway region or the trouble region of the golf mat.

2. The virtual golf simulation apparatus according to claim 1, wherein the control unit controls simulation to be performed according to a ball flight distance decreasing rate preset with respect to a corresponding virtual landform based on whether the virtual ball is placed in a fairway, a rough, or a bunker on the virtual golf course of the simulation image.

3. The virtual golf simulation apparatus according to claim 1, wherein the control unit is set to calculate different ball flight distances based on kinds of a virtual landform, in which the virtual ball is placed, on the virtual golf course.

4. The virtual golf simulation apparatus according to claim 1, wherein the control unit is set to calculate different compensation values based on whether the physical golf ball detected by the sensing device is placed in the fairway region or in the trouble region on the golf mat so as to adjust the ball flight distance.

5. The virtual golf simulation apparatus according to claim 1, wherein
the trouble region of the golf mat is divided into a rough region and a bunker region, and
the control unit is configured to calculate a specific ball flight distance decreasing rate with respect to a corresponding virtual landform based on whether the virtual ball is placed in a fairway, a rough, or a bunker on the virtual golf course of the simulation image and to calculate a specific compensation value with respect to a corresponding virtual landform based on whether the physical golf ball sensed by the sensing device is placed in the fairway region, in the rough region, or in the bunker region, thereby performing simulation based on results obtained by calculating the ball flight distance decreasing rate and the compensation value according to predetermined conditions.

6. The virtual golf simulation apparatus according to claim 1, wherein
the trouble region of the golf mat is divided into a rough region and a bunker region, and
the control unit is configured to calculate a specific ball flight distance decreasing rate with respect to a corresponding virtual landform based on whether the virtual ball is placed in a fairway, a light rough, a heavy rough, a fairway bunker, or a green bunker on the virtual golf course of the simulation image and to calculate a specific compensation value.

7. A computer-implemented virtual golf simulation method, the method comprising:
detecting whether a physical golf ball is placed on a fairway region or a trouble region of a golf mat, the golf mat having regions comprising the fairway region and the trouble region;
detecting movement of the physical golf ball from one of the regions after the physical golf ball is hit by a golf swing;
determining, by a processor, a simulation image regarding the trajectory of a virtual ball associated with the virtual golf course according to the detected one of the regions and the movement;
calculating, by the processor, the trajectory of the virtual ball based on movement of the physical golf ball; and
adjusting the virtual ball flight distance by calculating an adjustment rate and to apply the adjustment rate to the trajectory of the virtual ball simulated, the adjustment rate being differently calculated according to whether the physical golf ball placed on the fairway region or the trouble region of the golf mat.

8. The virtual golf simulation method according to claim 7, further comprises:
detecting a virtual landform, in which the virtual ball is placed, on a virtual golf course; and
calculating a ball flight distance decreasing rate with respect to the detected virtual landform.

9. The virtual golf simulation method according to claim 7, further comprises:
detecting where the physical golf ball placed on the golf mat;
determining where the detected physical golf ball is placed; and
calculating a compensation value with respect to the region in which the detected physical golf ball is placed.

10. The virtual golf simulation method according to claim 7, wherein
the trouble region of the golf mat is divided into a rough region and a bunker region, and
calculating the ball flight distance using a decreasing rate which comprises determining whether the virtual ball is placed in a fairway, a rough, or a bunker on the virtual golf course and calculating a ball flight distance using the decreasing rate with respect to a landform, in which the virtual ball is placed, and
calculating compensation value using the calculated adjustment rate based on determining whether the physical golf ball is placed in the fairway region, in the trouble region comprising a rough region, or in a bunker region of the golf mat and calculating the compensation value with respect to the region, in which the physical golf ball is placed.

11. The virtual golf simulation method according to claim 10, wherein
the trouble region of the golf mat is divided into a rough region and a bunker region, and
determining whether the virtual ball is placed in a fairway, a light rough, a heavy rough, a fairway bunker, or a bunker on the virtual golf course and calculating a ball flight distance decreasing rate preset with respect to the landform, in which the virtual ball is placed, and
calculating the compensation value comprises determining whether the physical golf ball is placed in the fairway region, in the rough region, or in the bunker region of the golf mat and calculating a compensation value preset with respect to the region, in which the physical golf ball is placed.

* * * * *